(12) United States Patent
Phillips et al.

(10) Patent No.: US 7,443,134 B2
(45) Date of Patent: Oct. 28, 2008

(54) BATTERY PACK SHIPPING SYSTEM AND METHOD

(75) Inventors: Steven J. Phillips, Ellicott City, MD (US); David A. Carrier, Aberdeen, MD (US); Danh Thanh Trinh, Parkville, MD (US); Andrew E. Seman, Jr., White Marsh, MD (US); Daniele C. Brotto, Baltimore, MD (US); Christopher R. Yahnker, Raleigh, NC (US); Jeffrey J. Francis, Nottingham, MD (US); Harry J. Campbell, Glen Rock, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/283,579

(22) Filed: Nov. 18, 2005

(65) Prior Publication Data

US 2006/0070910 A1 Apr. 6, 2006

Related U.S. Application Data

(62) Division of application No. 11/071,887, filed on Mar. 3, 2005.

(60) Provisional application No. 60/551,211, filed on Mar. 8, 2004.

(51) Int. Cl.
*H01M 10/44* (2006.01)
*H01M 10/46* (2006.01)

(52) U.S. Cl. ............................................ 320/107

(58) Field of Classification Search ................. 320/107, 320/112, 114, 115, 116; 206/701, 703, 461, 206/723
See application file for complete search history.

(56) References Cited

U.S. PATENT DOCUMENTS

| 2004/0222118 | A1* | 11/2004 | Melgaard ..................... 206/461 |
| 2004/0257038 | A1 | 12/2004 | Johnson et al. |
| 2004/0263119 | A1 | 12/2004 | Meyer et al. |
| 2005/0007068 | A1 | 1/2005 | Johnson et al. |
| 2005/0173275 | A1* | 8/2005 | Russo ......................... 206/320 |

OTHER PUBLICATIONS

Code of Federal Regulations, Title 49, vol. 2 (revised Oct. 1, 2005); 49 CFR 173.185 (p. 528-530).
Code of Federal Regulations, Title 49, vol. 2 (revised Oct. 1, 2005); 49 CFR 173.140 (p. 511).
Code of Federal Regulations, Title 49, vol. 2 (revised Oct. 1, 2003); 49 CFR 173.159 (p. 501-504).

* cited by examiner

*Primary Examiner*—Edward Tso
(74) *Attorney, Agent, or Firm*—Harness, Dickey & Pierce, P.L.C.

(57) ABSTRACT

A battery pack packaging system and method includes a kit box with a body, a first receptacle in the body operable to receive at least one of a cordless device and a charging device, a second receptacle in the body, and a battery container removably received by the second receptacle, the battery container configured to meet regulatory rules for shipping a battery pack with a cordless device or separately from a cordless device.

2 Claims, 5 Drawing Sheets

BATTERY PACK SHIPPING SYSTEM AND METHOD

CROSS-REFERENCE TO RELATED APPLICATIONS

This application is a divisional of U.S. patent application Ser. No. 11/071,887, filed on Mar. 3, 2005, which claims the benefit of U.S. Provisional Application No. 60/551,211, filed on Mar. 8, 2004. The disclosures of the above applications are incorporated herein by reference.

FIELD OF THE INVENTION

The present invention generally relates to battery pack packaging and, more specifically, to improved packaging for battery packs.

BACKGROUND OF THE INVENTION

International goods transportation regulations pertaining to lithium and lithium ion cells and batteries have tightened as a result of increasing concern by regulatory officials regarding shipments of high-energy density batteries and the proliferation of lithium ion battery technologies. Current regulations limit the lithium content of lithium batteries, and subject lithium ion batteries to a lithium equivalency calculation where equivalent lithium content is calculated in grams on a per-cell basis to be 0.3 times the rated capacity in ampere hours. Thus, the equivalent lithium content for a battery is the rated capacity in ampere hours for a single cell multiplied by 0.3 and then multiplied by the number of cells in the battery or battery pack.

Current regulations set lithium content or equivalent content limits for cells and batteries. For a lithium metal or lithium alloy cell, the lithium content limit is not more than 1.0 gram per cell and not more than 2.0 grams per battery. Also within the regulations is an exception that allows lithium ion cells containing less than 1.5 grams of equivalent lithium content and lithium ion batteries containing less than 8.0 grams of equivalent lithium content to be shipped without undergoing certain testing and other requirements required of larger lithium and lithium ion cells and batteries.

SUMMARY OF THE INVENTION

A kit box according to the invention includes a body, a first receptacle in the body and operable to receive a cordless device, a second receptacle adjacent the first receptacle, and a battery container removably placed in the second receptacle. The battery container may be configured to meet regulatory rules for shipping a battery pack. The kit box may include a battery container configured to meet regulatory rules when shipped with the cordless device, or the battery container may be configured to meet regulatory rules when shipped separately from the cordless device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
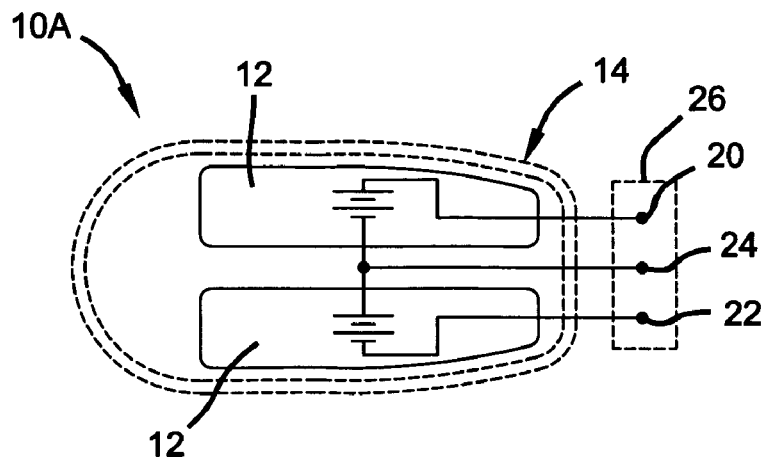
FIGS. 1-6 are schematic views of various battery packs according to the invention.

The following description of the preferred embodiment(s) is merely exemplary in nature and is in no way intended to limit the invention, its application, or uses.

Referring to the drawings, and to FIGS. 1-6 in particular, a battery pack 10 is shown in several variations (battery pack 10A-10F) and generally includes multiple batteries 12 having terminals for connecting to a charging device and/or cordless device. As shown, each battery pack 10 includes two batteries 12, but additional batteries 12 may be included. Battery packs 10A, 10B and 10F are unitary in construction, while battery packs 10C, 10D and 10E are physically separable into multiple parts.

Battery packs 10 may be configured including any number of cells to provide the required storage capacity. For packaging and transportation, however, a range of configurations designed to both meet regulations and adequately supply capacity may be constructed. For example, a 36-volt 10-cell lithium ion battery pack provides adequate capacity between about 2.17 and 2.67 ampere hours, and provides preferred capacity between about 2.17 and 5.56 ampere hours. For a 36-volt, 20-cell lithium battery pack configuration, adequate capacity can be achieved with ten two-cell units, wherein each cell provides between about 1.08 and 1.33 ampere hours, and provides preferred capacity between about 1.08 and 2.78 ampere hours. Each cell of the two-cell unit is wired in parallel to the other cell and the ten units are wired in series to form the pack (a 2p10s pack configuration). Each two-cell unit may provide a storage capacity between about 2.17 and 2.67 ampere-hours, and preferably between 2.17 and 5.56 ampere-hours. For both the 10- and 20-cell configurations, the range for adequate capacity yields an equivalent lithium content between about 6.5 and 8.0, and watt hours between about 18 and 96; the range for preferred capacity yields an equivalent lithium content between about 6.5 and 16.7, and watt hours between about 78 and 200.

Each battery 12 represents a plurality of battery cells (cell stack) connected in series to define the voltage and in parallel to define the storage capacity for battery 12. The configuration of battery pack 10 permits operational flexibility by allowing terminals in a cordless device and/or charging device to selectively short one or more terminals of batteries 12 to connect the batteries in series or parallel as dictated by charging requirements or cordless-device type. Series manipulations adjust the voltage of battery pack 10 and parallel manipulations adjust the storage capacity of battery pack 10. For example, two 18-volt batteries 12 connected in parallel may supply 18 volts to a cordless device at a higher capacity than two 18-volt batteries 12 connected in series.

That is, the same two 18-volt batteries 12 connected in series may supply 36 volts, but only half the capacity of the parallel configuration.

As shown in FIG. 1, battery pack 10A includes a first battery contact 20, a second battery contact 22, and a third battery contact 24 in a terminal block 26. Battery contact 20 is the B+ (positive) terminal for battery pack 10A. Battery contact 22 is the B− (negative/common) terminal for battery pack 10A. Battery contact 24 is an intermediate terminal dividing the battery pack 10A into a pair of batteries 12, each including a separate stack of cells. Battery contact 24 allows series manipulations of batteries 12. Additional contacts can be provided to further divide the battery pack 10A into multiple batteries 12.

Figure 2:
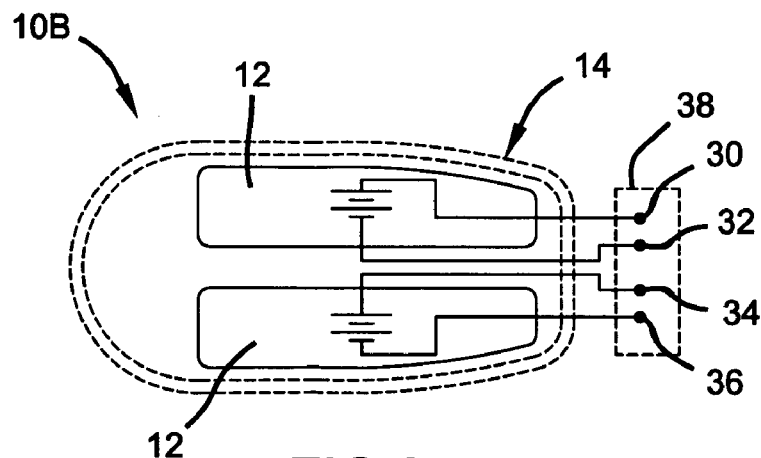

With reference to FIG. 2, battery pack 10B includes a pair of batteries 12, each including a plurality of battery cells connected in series and/or parallel. The battery pack 10B includes a terminal block 38 having four battery contacts: first battery contact 30, second battery contact 32, third battery contact 34, and fourth battery contact 36. First and third battery contacts 30 and 34 are B+ (positive) terminals for the respective battery 12. Second and fourth battery contacts 32 and 36 are B− (negative/common) terminals for the respective battery 12. As shown, a pair of batteries 12 define the battery pack 10B, each representing a separate stack of cells connected in series and/or parallel to define the voltage and capacity of battery 12. It should be noted, however, that more than two separate cell stacks, each defining a battery 12, can be provided in the same battery pack 10B. Further, through terminal block 38, batteries 12 may be connected in series or parallel to manipulate the voltage and capacity of battery 12 or battery pack 10.

Figure 3:
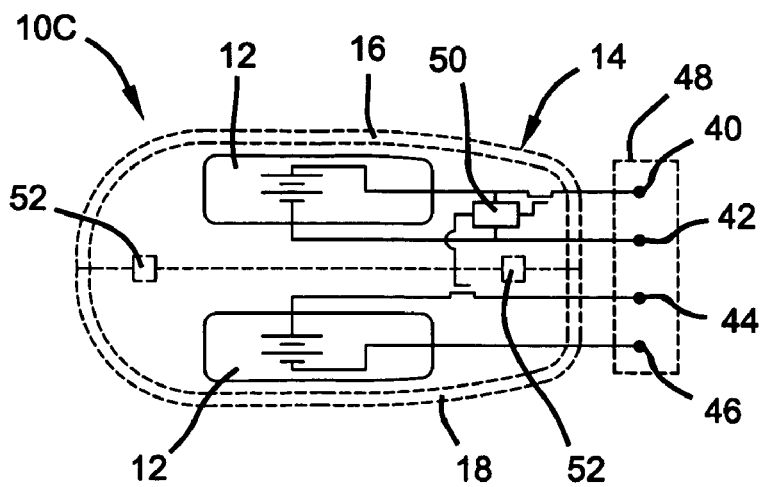

Referring now to FIG. 3, battery pack 10C includes a housing 14 having housing parts 16 and 18 coupled by a mechanical interface 52. The mechanical interface 52 may be any structure for joining separate parts. Further, battery pack 10C includes a controller 50 electrically coupled to a terminal block 48 having a first contact 40, a second contact 42, a third contact 44, and a fourth contact 46. The first and third battery contacts 40, 44 are B+ (positive) terminals for respective batteries 12, while second and fourth battery contacts 42, 46 are B− (negative/common) terminals. Batteries 12 may be connected in series or parallel to manipulate the voltage and capacity of battery 12 or battery pack 10. The controller 50 may be a microprocessor or other circuit to control charging and discharging of the battery pack 10, and also provides safety and control functions including communication, identification, status, diagnostic, logging and switching. The controller 50 provides these functions for the plurality of batteries 12 included in battery pack 10, wherein batteries 12 may each including a plurality of battery cells connected in series and/or parallel.

Figure 4:
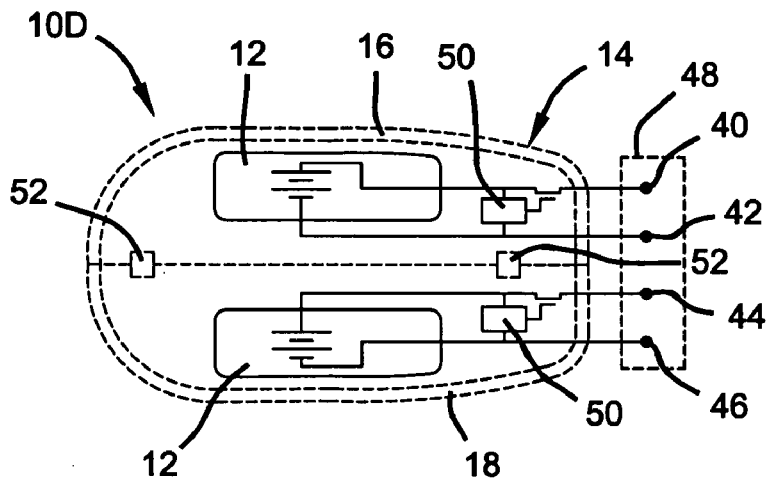

Battery pack 10D of FIG. 4 is similar to battery pack 10C of FIG. 3 but includes separate controllers 50 in each housing part 16, 18. In this manner, each battery 12, which may include a plurality of battery cells connected in series and/or parallel, includes its own controller 50 providing the various functions discussed above.

Figure 5:
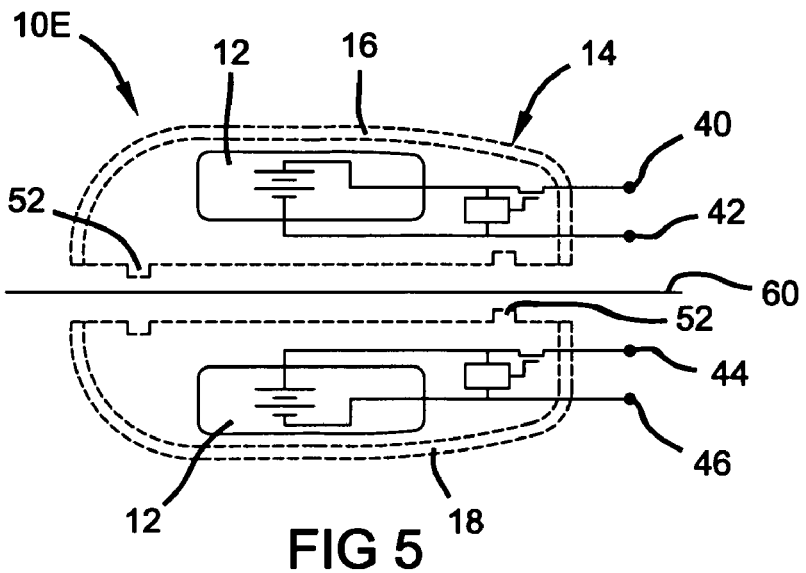

Battery pack 10E of FIG. 5 is similar to battery packs 10C and 10D of FIGS. 3 and 4, respectively, but further includes a separator material 60 to physically separate the housing parts 16, 18 for storage, display and/or shipping. Separator material 60 functions to prevent electrical connection between the circuits of separate batteries 12 disposed in each of housing parts 16, 18. Further, separator material 60 prevents the spread of flame should either housing part combust while being stored, displayed or shipped. Thus, separator material 60 may be fabricated from a material having insulative and/or flame retardant properties.

Figure 6:
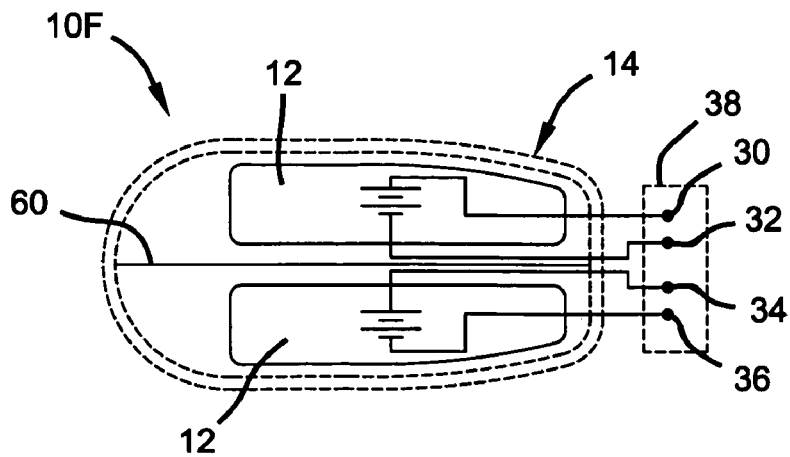
Figure 7:
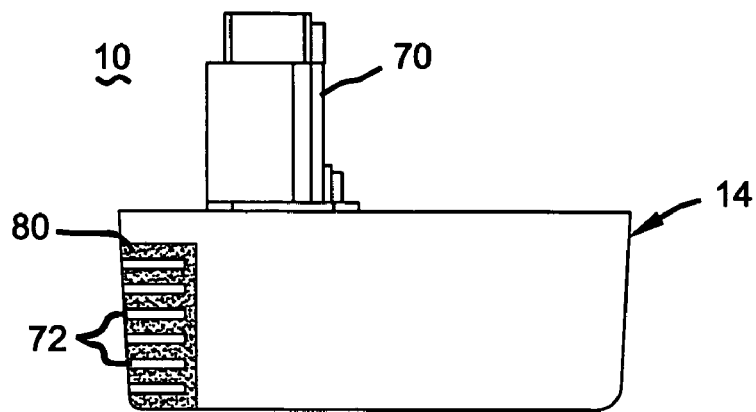
FIG. 7 is a side view of a battery pack according to the invention.
Figure 8:
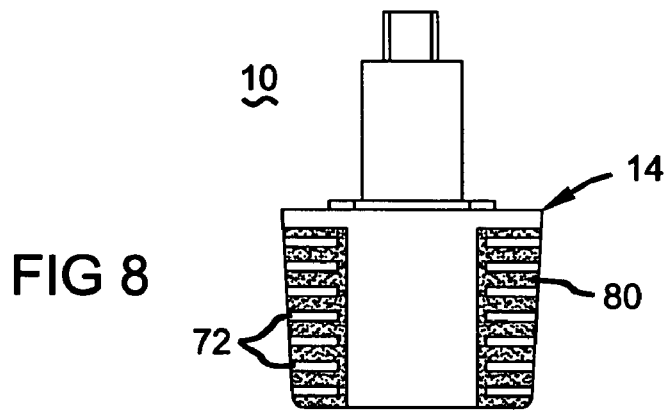
FIG. 8 is an end view of a battery pack according to the invention.
Figure 9:
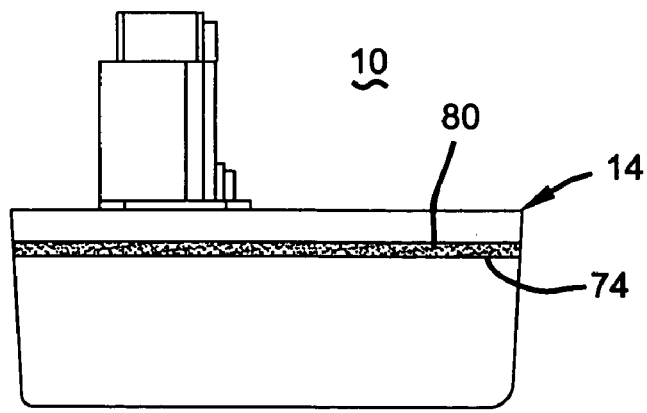
FIG. 9 is a side view of a battery pack according to the invention.
Figure 10:
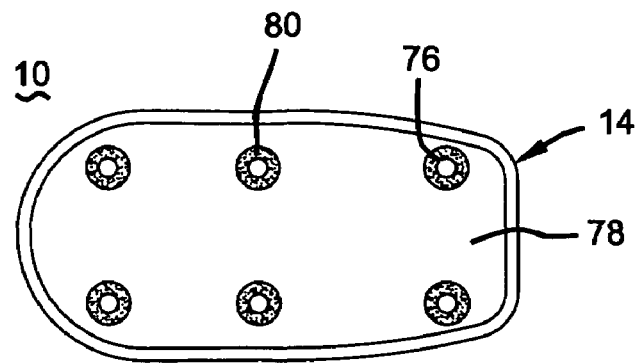
FIG. 10 is a plan view of a battery pack according to the invention.

Battery pack 10F of FIG. 6 is similar to battery pack 10B of FIG. 2, but includes separator material 60 in battery pack 10F, which is unitary in construction, in order to provide the control and safety features during storage, display or shipping. Separator material 60 is integrated into housing 14 of battery pack 10F to provide insulative and/or flame retardant properties between batteries 12 and within housing 14.

Battery pack housing 14, whether unitary in structure (FIGS. 1, 2 and 6) or including physically separable housing parts 16, 18 (FIGS. 3, 4 and 5) may be fabricated from a non-flammable material to contain combustion within housing 14 or a housing part 16, 18. Further, by providing a more durable housing, potential for damage to the batteries 12 can be lessened, thereby reducing potential combustion issues. Battery pack housing 14 may be fabricated from steel, sheet metal, aluminum, magnesium or titanium, or any other material that functions to retard flame or prevent combustion. Further, battery pack housing 14 may incorporate intumescent material. For example, plastic resin pellets may be combined with intumescent material pellets and injection molded to form a battery pack housing 14 that retards flame or prevents combustion.

Battery packs 10 are often used with cordless products, from housewares to power tools. Whether nickel-cadmium, nickel-metal hydride, lithium, lithium ion or lithium polymer are used as the storage medium, battery pack 10 generally includes cell stacks disposed within housing 14 and terminal block 26, 38, 48 providing electrical communication between the battery pack 10 and the cordless product for which it is supplying electricity. Terminal block 26, 38, 48 and cell stacks are electrically connected and such electrical connections are not shown for the sake of clarity.

With reference to FIGS. 7-10, housing 14 of battery pack 10 includes a tower 70, which may include an aperture (not shown) exposing terminal block 26, 38, 48 for electrical connection to a cordless product. The housing generally includes air vents 72 and may include one or more housing parts 16, 18 or covers 78 requiring a joint 74 and/or bosses 76. To the extent apertures or seams are included in housing 14 because of such joints and/or bosses, flame may escape housing 14 should combustion occur. Thus, even where housing 14 is constructed from an insulative or flame retardant material as discussed above, the apertures and/or seams provide a passage for combustion to spread to other battery packs 10 or housing parts 16, 18 during storage, display or shipping. The seams and/or apertures may include intumescent material 80, such as caulk, disposed adjacent air vent 72, along joint 74 or about bosses 76 to plug the aperture and/or seal the seam upon exposure to high heat or flame. Thus, upon high heat, combustion or fire in battery pack 10, intumescent material 80 expands to plug or seal air vents 72, joints 74, or bosses 76 to prevent the spread of combustion to other battery packs 10 or housing parts 16, 18.

Intumescent material 80, such as a coating, may be applied to housing 14 to ensure structural performance and contain any combustible materials within battery pack 10 or housing parts 16, 18. Similarly, intumescent material 80 may be used to fabricate or coat spacers, insulation plates, gaskets, cell insulators and/or cushions within the battery pack to further contain combustion. Most components of the battery pack, 10 may be constructed or coated with intumescent material 80.

Figure 11:
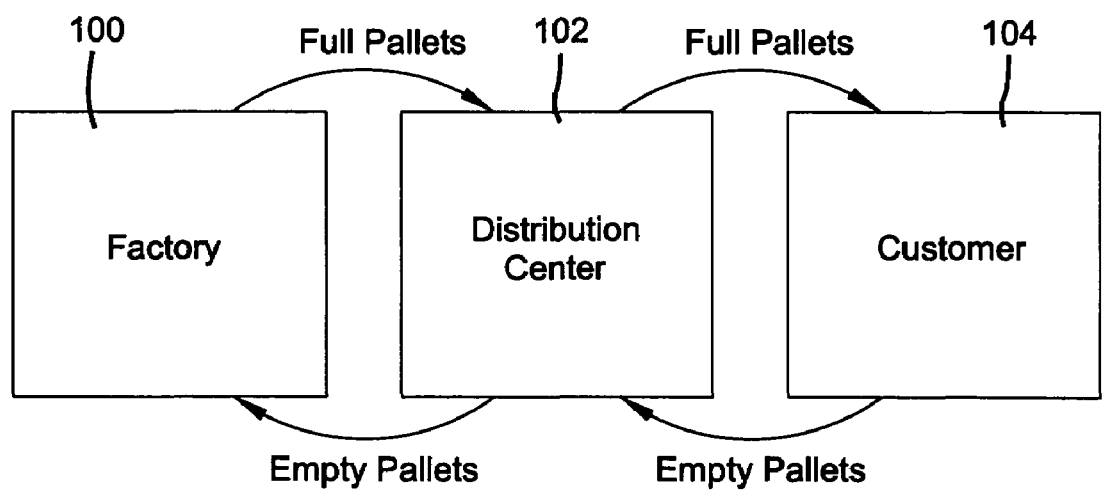
FIG. 11 is a diagram illustrating a method according to the invention.

When shipping battery packs 10, whether a unitary construction or including housing parts 16, 18, specialized pallets may be used to provide additional safeguards. As shown in FIG. 11, such pallets are shipped from a factory 100 to a distribution center 102 and then to a customer 104, such as a retail outlet. Because of the specialized design of the pallets, it is advantageous for cost and logistical reasons to return the empty pallets from the customer 104 to the factory 100 for reuse, either directly or through the distribution center 102. Such a distribution method according to the invention provides transportation efficiency in meeting regulatory rules, such as by electrically separating batteries 12 of battery pack 10A, 10B or 10F, for example. The specialized pallets may provide separate shipment storage for housing parts 16, 18 of battery pack 10C or 10D, for example. The specialized pallets may provide separating material 60 for isolating housing parts 16, 18, such as that shown for battery pack 10E.

Figure 12:
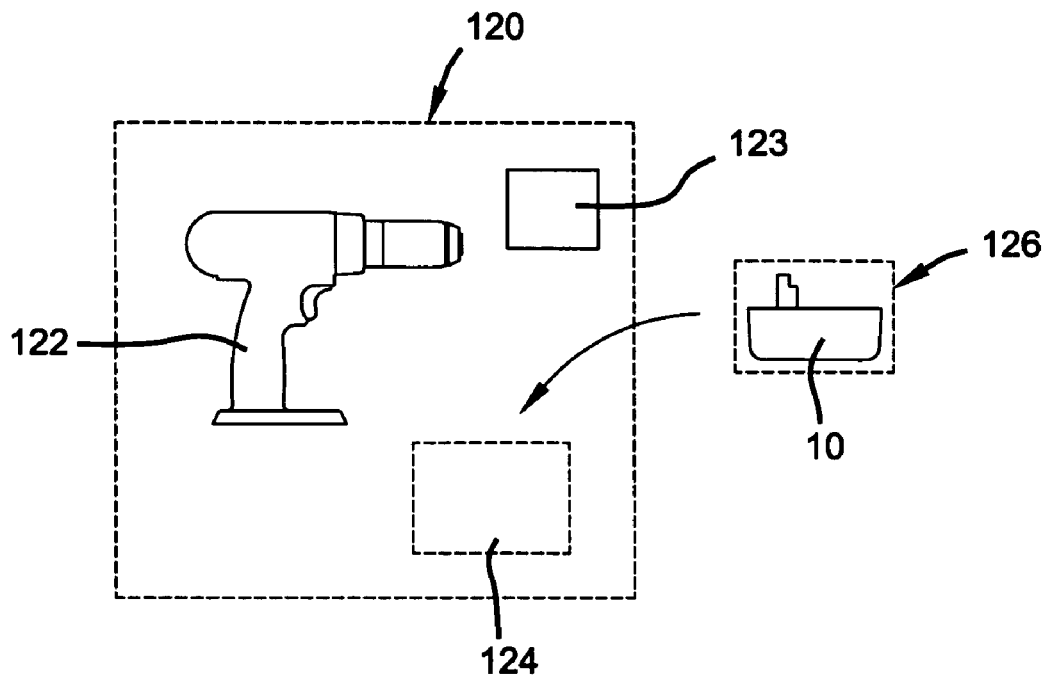
FIGS. 12 and 13 are schematic views illustrating another method according to the invention.
Figure 13:
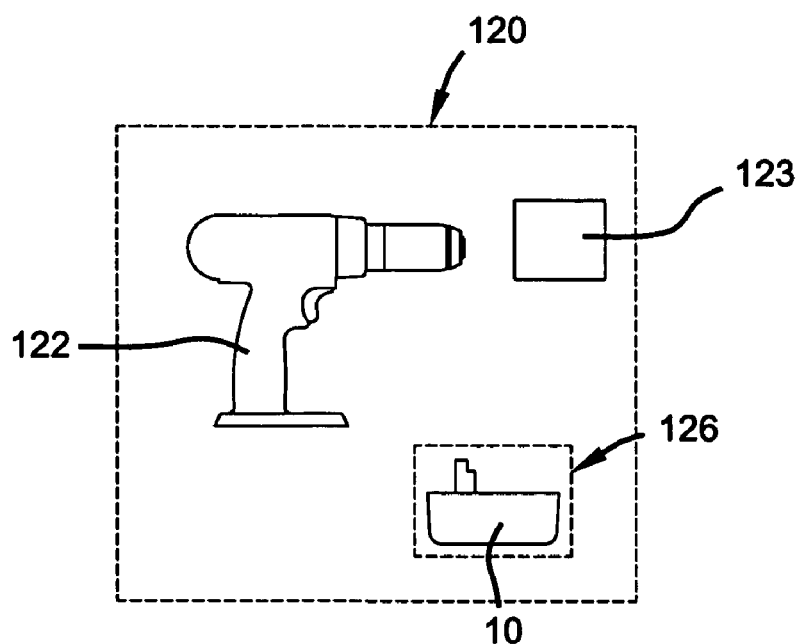

With reference to FIG. 12, a kit box 120 is shown including receptacles receiving a cordless device 122 and a battery charging device 123, as well as a receptacle 124 adapted to receive a container 126 for shipping battery pack 10. Container 126 may be designed or fabricated to meet regulatory rules as described above, or any variation thereof. Because the kit box 120 is the shipping container for at least the cordless device 122 and battery charging device 123, any regulatory rules covering battery pack 10 may be met by separately packaging and/or shipping battery pack 10 in container 126, which is fabricated to meet regulatory rules, thereby limiting the expense of containing the entire kit in a container or kit box fabricated to meet regulatory rules. If shipped separately, at customer 104, container 126 is placed in kit box 120 for display and sale, as shown in FIG. 13. Alternatively, battery pack 10 can be shipped, stored and displayed in a suitable container 126 in kit box 120, as shown in FIG. 13, where container 126 is fabricated to meet regulatory rules. Kit box 120 may be used by the customer to store and transport cordless device 122.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A kit box comprising:
   a body;
   a first receptacle in said body that receives at least one of a cordless device and a charging device;
   a second receptacle in said body, said first and second receptacles being positioned in said body; and
   a battery container removably received by said second receptacle, said battery container containing a battery pack therein, said battery container fabricated to enable said battery container to be shipped separately from said body containing at least one of the cordless device and the charging device.

2. A method of packing a kit box comprising:
   placing a battery pack in a battery container;
   placing a cordless power tool device in a first receptacle of a kit box;
   shipping said battery pack to a customer in said battery container;
   separately shipping said cordless power tool device to the customer in said kit box; and
   placing said battery container in a second receptacle of said kit box after being shipped to said customer.

* * * * *